United States Patent Office 3,350,214
Patented Oct. 31, 1967

3,350,214
HIGH TEMPERATURE COMPOSITIONS
Roger A. Long, San Diego, Calif.
No Drawing. Application Apr. 12, 1957, Ser. No. 652,358, now Patent No. 2,982,619, dated May 2, 1961, which is a continuation of application Ser. No. 177,548, Aug. 3, 1950. Divided and this application Nov. 23, 1960, Ser. No. 71,366
2 Claims. (Cl. 106—55)

This is a divisional application of my continuation application Ser. No. 652,358 filed Apr. 12, 1957, entitled "Metallic Compounds for Use in High-Temperature Applications, now U.S. Patent No. 2,982,619.

Application Ser. No. 652,358 is a continuation of patent application Ser. No. 177,548 filed Aug. 3, 1950, for "Metallic Components for Use in High-Temperature Applications," now abandoned.

This invention relates to metallic compounds which are characterized by a relatively high melting point, i.e., relatively high refractoriness, and by resistance to oxidation and abrasion at elevated temperatures. In particular the invention relates to inter-metallic compounds of silicon with certain metals of the fourth and sixth groups of the periodic table of the elements. More specifically the invention relates to an inter-metallic compound of molybdenum di-silicide and to its properties and uses.

The general object of the invention is to produce an inter-metallic compound or an intermediate solid solution of silicon and a metal selected from the group consisting of uranium, molybdenum, chromium, tungsten, zirconium, and titanium by a novel method of heat treatment.

It is a further object of the invention to produce an inter-metallic compound of silicon with one of the above defined metals which is relatively refractory and resistant to abrasion at high temperatures.

It is a particular object of the invention to produce an inter-metallic compound of silicon and molybdenum in which these components are combined in the stoichiometric proportions of molybdenum di-silicide ($MoSi_2$).

It is an additional object of the invention to produce a di-silicide of molybdenum which by methods of powder metallurgy may be molded and shaped into products that are resistant to oxidation, are of accurate dimensions and relatively high mechanical strength.

An object also is to provide a composition formed by a mixture of a di-silicide of a metal selected from the group consisting of uranium, molybdenum, chromium, tungsten, zirconium, and titanium, with other metals, semi-metals, oxides, carbides, borides or other silicides.

An additional object of the invention is to produce a compound of silicon having high corrosion and wear-resistant properties.

Prior scientific and patent literature contains various suggestions for the production of molybdenum disilicide. However, as far as the inventor is aware, there was not available up to the present time a simple process for producing molybdenum disilicide of relatively high purity in a form in which it could be readily comminuted into fine particles for use in producing by powder-metallurgy technique shaped cemented bodies of great hot strength and corrosion resistance.

The present invention is based on the discovery that, when a stoichiometrically proportioned intimate mixture of fine particles of molybdenum and silicon, corresponding to the formula $MoSi_2$, is heated to an elevated temperature of about 2000° F., which is well below the melting point of these components, a reaction takes place between them which results in the production of relatively pure molybdenum disilicide in a friable form which may be readily comminuted into fine powder particles suitable for powder metallurgy processing. The reaction of the silicon with the molybdenum is exothermic and the temperature rises to about 3000° F. The silicon reacts with the molybdenum throughout the mass and forms a new lattice structure. This is shown by X-ray diffraction tests which show the disilicide pattern present, and silica. When the reaction is run in a vacuum or a reducing or inert atmosphere, the excess silicon appears as silicon and not as silica.

This inventor has produced the molybdenum disilicide in powdered form for use in molding various articles by the different methods of powder metallurgy. He obtained the disilicide in powdered form by mixing one equivalent of powdered molybdenum with two mols equivalents of powdered silicon (325 mesh size), thoroughly mixing this mixture as in a ball mill, removing the mixture from the ball mill and heating the stoichiometrically proportioned fine mixture in air, vacuum or inert gas atmosphere until an exothermic reaction occurred. A suitable vessel of refractory material, such as a crucible or boat of alundum, beryllia, etc., may be used for holding the powder mixture which is produced in the furnace. This reaction took place at about 1900° F.±100° F. with a subsequent temperature rise to about 3000° F. The powder was then crushed, ball-milled and leached with concentrated nitric acid to remove any unreacted molybdenum metal and with hot hydrochloric acid to remove any molybdenum oxide. Leaching is not necessary when reacting in a vacuum or gas atmospheres. It was found that the silicon volatilized at the reaction temperature under a vacuum; that it was necessary to carry the reaction to completion in a partial pressure atmosphere of argon or helium when such gas was introduced into the vacuum to furnish up to one half to three quarters atmospheric pressure.

The molybdenum disilicide produced by this method was not fused; it was friable and was readily ground to a desired fineness by ball-milling or other particle reducing methods. This grinding will be described hereinafter.

It was also discovered that a mass of high-purity powder of molybdenum disilicide ($MoSi_2$), fine particles, without addition of any generally used binder substances, such as, cobalt, nickel, or the like, will when compacted under pressure and heat by known powder metallurgical techniques yield a cemented body of substantially pure molybdenum disilicide ($MoSi_2$) exhibiting extremely desirable hot, physical and mechanical properties, which combined with its superior corrosion resistance makes it ideal for applications such as gas-turbine buckets, flame holders and the like.

This inventor produced the disilicides of metals other than molybdenum by this direct reaction method. In particular he produced the disilicides of uranium, chromium, tungsten, zirconium, and titanium. These silicides vary from one to the other in their physical properties and construction. They vary in refractoriness and in resistance to oxidation at high temperature. But all are useful in certain applications.

These disilicides may be considered as being inter-metallic compounds or metal compound phases. Broadly they are intermediate solid solutions some of which have wide and other narrow ranges of homogeneity. Since true intermetallic compounds have narrow ranges of homogeneity and simple stoichiometric proportions with atoms of identical kinds occupying identical points on the lattice, all of the disilicides of this invention cannot be classed as true intermetallic compounds. They are all intermediate solid solutions and some of them, for example, $USi_2$, $WSi_2$, $TiSi_2$, $CrSi$, and $ZrSi_2$ may be of either type, particularly $ZrSi_2$ and $TiSi_2$ which apparently have wide range of homogeneity and can contain excessive silicon and/or excessive zirconium in solution with the disilicide.

The use of these powdered disilicides is extensive. They may be used as a protective coating on other metal bases to inhibit oxidation of such bases at elevated temperatures, or they may be used as metallic powders either alone or alloyed with other metals or semi-metals to form articles of simple or relatively complicated shape by the methods of powder metallurgy.

As a protective coating on other metallic bases, molybdenum disilicide may preferably be applied in one of three ways:

(1) As a coating on molybdenum, silicon is applied as a coating on a piece of molybdenum, the coated piece is then heated to a temperature at which diffusion occurs, and the silicon diffuses into the molybdenum thereby forming a strong bond for the coating to the base metal.

(2) The application of a disilicide of one of the metals of the above defined group, for instance, molybdenum disilicide as a protective coating on the surface of a base material. The coating is applied by spraying the powdered disilicide by means of a powdered metal spray gun in an atmosphere of helium, argon, nitrogen, or hydrogen under a pressure of from five to eight atmospheres and subsequently diffusing the disilicide into the base material in an inert gas atmosphere or vacuum.

(3) The disilicide is worked up in a carrier medium and applied as a brush coat on the surface of the base metal. The coated metal is then baked at a high temperature in an inert atmosphere or vacuum to diffuse the disilicide into the surface of the base metal thereby forming a strong bond for the disilicide coating.

The fabrication of the powdered disilicides of the group of metals above defined, and of molybdenum in particular, can be accomplished by a number of methods for example as follows:

(1) Cold pressing and sintering
(2) Hot pressing
(3) Vacuum casting
(4) Hot coining
(5) Swaging and rolling The formed material can be machined and brazed to the final required forms by methods such as:

(1) Grinding, diamond or gravity fed silicon carbide wheel.
(2) Machining, using carbide tools (only when in a partially sintered condition).
(3) Brazing, using silver, copper or colomonoy alloys.

*Production of articles by the hot press method*

The disilicides of the metals above defined may also be molded and shaped in powdered form by the "hot press method." In particular molybdenum disilicide, which may be prepared with a purity of about 99.8%, may be molded by this method. For successful use in this method of pressing, the powder must be ground to a fine state of subdivision. This reduction in particle size is preferably accomplished by wet ball milling of the powder in an alcohol or acetone medium for control.

This inventor has found that if maximum high-temperature properties are desired, the particle size of the powdered disilicide for hot pressing and probably for the other methods herein described, should be as follows:

TABLE I

| Particle Size, microns | Percent of Total |
|---|---|
| 0-6 | 90-100 |
| 6-25 | 0-10 |

Test data indicates that as regards to strength at least 90 percent of the particles must be less than 6 microns in diameter.

The powder upon removal from the ball mill must be completely dried and when necessary leached with dilute hydrochloric acid to remove metallic iron which may have been picked up during ball milling.

The powder is then pressed to the shape desired by the use of graphite form molds. The temperature used for hot pressing may vary between 2600° F. and 3100° F. Because of commercial limitations it is more practicable to use temperatures within the range of 2700° F. to 3000° F.

The pressure used for hot pressing may be varied generally from 500 to 7000 pounds per square inch depending upon the strength of the graphite dies and the temperature used for pressing. The relative brittleness of the disilicide, however, increases with increase in the applied pressure to the maximum allowable with the graphite dies. It is therefore more desirable to use pressures near the means of the pressure limits for reasons of cost as well as less brittleness. The density of the disilicide also generally increases with the pressure and a pressure of from 1000 to 2000 pounds per square inch is required to obtain a density of over 5.0 grams per cubic centimeter when using fine powder (90% less than 6 microns).

Prolonged soaking at the temperature of hot pressing increases slightly the shock resistance or toughness of the disilicide at room temperature. Pressing and soaking at temperatures of 2900°–3200° F. have a greater effect on shock resistance or toughness of pieces than on samples pressed and soaked at lower pressing temperatures. Apparently the pressing temperature is the effective variable in the control of this physical characteristic.

The fractured disilicide, when hot pressed under the optimum conditions of temperature, pressure, particle size and particle size distribution, has a fine grained, silky, satiny luster similar to that obtained when hot-pressed cemented tungsten carbide is fractured.

The density of the hot pressed disilicide may be varied over the range of from 5.00 to about 6.15 grams per cubic centimeter by variation in the following physical characteristics of the components and factors in the method of pressing:

(a) Particle size.
(b) Particle size distribution.
(c) Pressure.
(d) Temperature of hot pressing.

The density for maximum strength properties varied between 5.80 and 6.15 grams per cubic centimeter with 5.80 to 5.95 being the more desirable density figure. The high density limit may be attained by:

(a) A fine particle size with non-uniform particle size distribution.
(b) A greater hot press pressure and a higher hot press temperature or
(c) A combination of both.

The low limit of density may be attained by:

(a) A very uniform fine particle size (100 percent less than 6 microns in diameter with 90 percent less than 3 microns).
(b) A lower hot pressure and a lower hot press temperature or
(c) A combination of both.

Reference to Table 2 shows that the density of the disilicide can be varied by merely varying the particle size and the particle size distribution and that with a decrease in density due to an increase in fineness of particle size and a more uniform particle size distribution there is a drop in the ultimate breaking strength at the same temperature.

The above described hot-press procedures have been used for making various fabricated parts, such as flameholder plates, turbine blades and bars.

*Mechanical properties at room and elevated temperatures of hot-pressed molybdenum disilicide*

In the following table are given test data on the change in ultimate breaking strength from that at room temperature to that at 1800°, 2000°, 2200°, and 2400° F. on rods of molybdenum disilicide which were formed by the hot-press method and which varied in particle size and particle size distribution as indicated.

TABLE 2

| Particle Size (Microscopic Count) | Density, g./cc. | Purity, percent | Test Temperature of— | Ultimate Breaking Strength, p.s.i. | Total Elongation, percent in 3" |
|---|---|---|---|---|---|
| 100—<16 microns, 50—<5 microns | 5.93–5.94 | 99.8 | Room Temp | 19,130 | Not detectable. |
| Do | 5.93–5.94 | 99.8 | 1,800° F | 18,500 | Do. |
| Do | 5.93–5.94 | 99.8 | 2,000° F | 20,000 | Do. |
| Do | 5.93–5.94 | 99.8 | 2,200° F | 21,000 | Do. |
| Do | 5.93–5.94 | 99.8 | 2,400° F | 21,500 | Do. |
| 90–95—<5 microns, 5–10—<25 microns | 5.90–5.92 | 99.0 | Room Temp | [1] >21,230 | Do. |
| Do | 5.90–5.92 | 99.0 | 2,000° F | 42,160 | Do. |
| Do | 5.90–5.92 | 99.0 | 2,200° F | 42,650 | Do. |
| Do | 5.90–5.92 | 99.0 | 2,400° F | [2] >34,900 | Do. |
| 98–99—<5 microns, 1–2—<6 microns | 5.87 | 99.0 | Room Temp | 29,600 | Do. |
| Do | 5.87 | 99.0 | 1,800° F | 40,050 | Do. |
| Do | 5.87 | 99.0 | 2,000° F | 41,800 | Do. |
| Do | 5.87 | 99.0 | 2,200° F | 37,000 | 0.1 percent. |
| Do | 5.87 | 99.0 | 2,400° F | 22,000 | 0.5 percent. |

[1] Broke in grip collet.
[2] Pulled through the high temperature grips.

*Note.*—The increase in elevated temperature tensile strength from the strength at room temperature is due to better alignment and fit of all grip material and specimen at the elevated temperatures. It could also be due to an increase in the disilicide ductility as the temperature increased (this ductility could be very little and not detectable by ordinary measuring methods). It is also possible that this increase is due to a diffusion process in the disilicide at elevated temperatures. Tests are now in progress to ascertain whether or not this is true.

The decrease in density with increase of uniformly distributed and decreased range in particle size is noted. The increase in ultimate breaking strength from that at room temperature to that at elevated temperatures is relatively great. This may be due to several causes of none of which is the inventor certain. This increase may be due to:

(a) Better alignment and fit of all grip material and the specimen.
(b) An increase in ductility of the disilicide. In other words this table shows generally that:

As the particle size decreases, (a) The elevated temperature breaking strength increases.
(b) The ductility increases.
(c) The density decreases slightly.

As the particle size distribution becomes more uniform, (a) The elevated temperature breaking strength decreases at temperatures at and above 2200° F.
(b) The ductility at elevated temperatures increases.
(c) The density tends to decrease slightly for similar pressing conditions.

In general it may be concluded from the data in Table 2 that:

(a) The ultimate breaking strength of the material remains approximately constant from room temperature to 2400° F. provided that the particle size and particle size distribution are as that shown in Table 1.
(b) The ductility of the material increases at elevated temperatures provided that particle size and particle size distribution are as shown in Line 1, Table 1.
(c) The ultimate breaking strength of the material decreases above 2200° F. and the ductility increases provided the particle size is 100 percent less than 6 microns and uniform in distribution (90 percent to 95 percent less than 3 microns in diameter).

Ductility is an important characteristic in many applications and uses of this material. This is the property which decreases the "notch" sensitivity, relieves initial thermal stresses, and facilitates commercial handling. It must be noted, however, that increase in ductility is accompanied by a decrease in high temperature strength, and that ductility at room temperature cannot be detected.

*Thermal expansion*

Determination of the cumulative thermal expansion of triangular prisms of molybdenum disilicide was made through the temperature range of room temperature to 1500° C. followed by a reverse determination of from 1500° C. to room temperature. The particle size of the sample is as shown in Table 1. The density of the sample was 5.93 to 5.94 grams per cubic centimeter. The test results are given in Table 3.

TABLE 3.—LINEAR THERMAL EXPANSION—CUMULATIVE PERCENT

| During Heating | | During Cooling | |
|---|---|---|---|
| ° C. | Percent | ° C. | Percent |
| Room Temp. | 0.00 | 1,500 | 1.35 |
| 100 | .04 | 1,400 | 1.21 |
| 200 | .12 | 1,300 | 1.09 |
| 300 | .20 | 1,200 | .97 |
| 400 | .29 | 1,100 | .86 |
| 500 | .38 | 100 | .75 |
| 600 | .47 | 900 | .65 |
| 700 | .56 | 800 | .56 |
| 800 | .65 | 700 | .46 |
| 900 | .74 | 600 | .38 |
| 1,000 | .85 | 500 | .29 |
| 1,100 | .95 | 400 | .20 |
| 1,200 | 1.06 | 300 | .12 |
| 1,300 | 1.16 | 200 | .05 |
| 1,400 | 1.26 | 100 | −.02 |
| 1,500 | 1.36 | Room Temp. | −.08 |

It is noted that the material had a linear shrinkage of .08 percent upon cooling to room temperature. This is due to an additional sintering action occasioned by the heating to 1500° C.

*Air corrosion properties*

This inventor has found that molybdenum disilicide is very resistant to corrosion, i.e. oxidation in air at elevated temperatures. Pieces of this disilicide of known area were held in a furnace, in an atmosphere of air, at temperatures of 2200° F., 2450° F., and 2850° F., for 100 hour, 200 hour, and 300 hour periods of time. The pieces were then cooled and the gain or loss in weight was determined. The results are given in the following table:

TABLE 4.—AIR CORROSION DATA

| Temperature, °F. | Rate, gm./cm.² hr. | | |
| --- | --- | --- | --- |
| | 100 hours | 200 hours | 300 hours |
| 2,200 [1] | $0.66 \times 10^{-6}$ | $1.0 \times 10^{-6}$ | $0.7 \times 10^{-6}$ |
| 2,450 [1] | $3.0 \times 10^{-6}$ | $0.96 \times 10^{-6}$ | $0.64 \times 10^{-6}$ |
| 2,850 [2] | $3.67 \times 10^{-6}$ | [3] $3.1 \times 10^{-6}$ | |

[1] Weight Gain.
[2] Weight Loss.
[3] Time, 135 hrs.

Examination of this table indicates that there is very little effect of air corrosion on the molybdenum disilicide at elevated temperatures. It is noted that at the lower temperatures (below 2500° F.) there is a weight gain, while after heating at the higher temperature there is a weight loss. This is due to the movement of a secondary impurity phase to the surface and the burning or volatilizing away of portions of this phase as it reaches the surface.

Electron diffraction photographs of the surface before and after heating has shown the presence of an amorphous phase on the surface after heating at 2850° F. This can be removed by slight polishing and the crystalline pattern of molybdenum disilicide surface returns. Metallographic analysis shows the loss of the secondary phase to the surface from the interior, which substantiates the electron diffraction and corrosion results.

The minute secondary phase thus accounts for the change in weight upon heating in the tests conducted. It is believed that by the elimination of this phase, the air corrosion resistance properties will be much better than that shown and that the physical properties will also be improved.

Chemical corrodibility

At normal temperatures molybdenum disilicide is relatively inert or non-reactive to acid or basic re-agents. Table 5 shows the percentage loss in weight per hour of this disilicide in reaction at 70° F. with two concentrations of nitric acid, hydrofluoric acid, sulphuric acid, hydrochloric acid and sodium hydroxide.

TABLE 5.—CHEMICAL CORRODIBILITY OF MOLYBDENUM DISILICIDE AT 70° F.

[Percent change in weight per hour]

| Concentration | $HNO_3$ | HF | $H_2SO_4$ | HCl | NaOH |
| --- | --- | --- | --- | --- | --- |
| 10% | 0.0006 | 0.0034 | 0.0019 | 0.0005 | 0.0012 |
| Concentrated | 0.0004 | 0.010 | 0.0012 | 0.0005 | 0.0001 |

The almost negligible reaction of this disilicide with the ordinary re-agents is clearly shown in the above table.

Wear resistance

The hardness of hot pressed molybdenum disilicide, Rockwell A–80–90, equals that of many of the present cemented carbides. Its resistance to wear, i.e. abrasion, is therefore believed to be of the same order as that of these carbides. Comparative data on this physical characteristic are not yet available. The combination of the resistance to abrasion of this material with its excellent physical strength and resistance to corrosion, all at elevated temperatures, opens up a rather extensive field of application in its use.

Non-metallic additions (1)

The addition of small amounts of oxides, carbides, borides and other silicides on the order of from 0.1 percent to 35 percent additions to the disilicide bodies is practical. These additions are made to increase the elevated temperature properties of the disilicide bodies for specialized purposes.

Non-metallic additions (2)

The use of molybdenum disilicide as a binder metal for very high temperature applications (3000° F. to 5000° F.) with such compounds as beryllia, alumina, and the metal carbides is practical.

Tests were run using BeO (Beryllia) and $A_2O_3$ (Alumina.) Samples containing up to 25 percent of molybdenum disilicide were hot pressed at a temperature above that of the disilicide. The compacts were then heated in air in an induction furnace to temperatures in excess of 3800° F. Little effect was noted on the samples and the use of this type of "ceramal" for very high temperature use looks promising.

Disclosure has been made of a preferred method of compounding the disilicides of certain metals of the fourth and sixth groups of the periodic table. The method disclosed does not involve the complete fusion of the base metal and the silicon as is done in the prior art. In this inventor's method the silicon upon reaction with the base metal enters the lattice structure thereof forming either a definite compound, an inter-metallic compound or an intermediate solid solution therewith. Inasmuch as it is sometimes desirable to have a small excess of silicon present and at other times a small excess of the group element present, variations from the particular proportions given supra can be made without departing from the spirit or scope of the invention beyond that as defined by the herewith appended claims.

The invention described herein may be manufactured and used by or for the Government of the United States of America for governmental purposes without the payment of any royalties thereon or therefor.

What is claimed is:

1. As an article of manufacture, a body characterized by relatively high refractoriness, resistance to corrosion and abrasion consisting essentially of particles of material from the class consisting of beryllia and alumina, and including, as a binder, a material from the class consisting of sintered powdered particles selected from the group consisting of particles of disilicides of uranium, molybdenum, chromium, tungsten, zirconium and titanium powdered substantially 100 percent to particle sizes less than 25 microns, said metallic binder being present from an amount sufficient to bind the particles of alumina and beryllia together up to about 25 percent of the weight of the body.

2. As an article of manufacture, a body characterized by relatively high refractoriness, resistance to corrosion and abrasion consisting essentially of particles of material from the class consisting of beryllia and alumina, and including, as a binder, sintered powdered particles of molybdenum disilicide in a percentage from an amount sufficient to bind the particles of beryllia and alumina together up to about 25 percent of the weight of the body, said particles of molybdenum disilicide being powdered substantially 100 percent to particle sizes less than 25 microns.

References Cited

UNITED STATES PATENTS 2,406,275   8/1946   Wejnarth _____ 106—65
3,027,330   3/1962   Schrewelius et al. ____ 106—55

TOBIAS E. LEVOW, *Primary Examiner.*

JOSEPH REBOLD, JOHN H. MACK, *Examiners.*

J. POER, *Assistant Examiner.*